(12) United States Patent
Kleemann et al.

(10) Patent No.: US 7,092,161 B2
(45) Date of Patent: Aug. 15, 2006

(54) OPTICAL ARRANGEMENT, OPTICAL GRATING AND METHOD FOR THE MANUFACTURE OF SUCH AN OPTICAL GRATING

(75) Inventors: Bernd Kleemann, Aalen (DE); Stefan Weissenrieder, Elchingen (DE); Jeffrey Erxmeyer, Oberkochen (DE); Ralf Kuschnereit, Oberkochen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 7 days.

(21) Appl. No.: 10/885,411

(22) Filed: Jul. 7, 2004

(65) Prior Publication Data

US 2005/0030627 A1 Feb. 10, 2005

Related U.S. Application Data

(63) Continuation of application No. PCT/EP03/00018, filed on Jan. 3, 2003.

(30) Foreign Application Priority Data

Jan. 7, 2002 (DE) ................................ 102 00 293

(51) Int. Cl.
*G02B 5/18* (2006.01)

(52) U.S. Cl. ...................................................... 359/571
(58) Field of Classification Search ................ 359/566, 359/569, 571, 572, 576
See application file for complete search history.

(56) References Cited

U.S. PATENT DOCUMENTS

| | | | | | |
|---|---|---|---|---|---|
| 6,162,495 | A | * | 12/2000 | Morton | 427/166 |
| 6,511,703 | B1 | * | 1/2003 | Pan et al. | 427/166 |
| 6,529,321 | B1 | * | 3/2003 | Pan et al. | 359/360 |
| 6,636,660 | B1 | * | 10/2003 | Tokumaru et al. | 385/24 |

* cited by examiner

*Primary Examiner*—Alessandro Amari
(74) *Attorney, Agent, or Firm*—Sughrue Mion, PLLC (57) ABSTRACT

An optical grating has a multiplicity of parallel diffraction structures, which are arranged on a support defining a base face. Each structure has a blaze flank that is inclined substantially at the Littrow angle with respect to the base face, and a back flank. Both flanks together form a reflection layer which comprises a reflective base layer and a transparent protective layer that is connected to the base layer and covers it. The protective layer on the blaze flank and the protective layer on the back flank are made of the same material. The thicknesses of the protective layers on the blaze flank and on the back flank, however, are different.

19 Claims, 9 Drawing Sheets

OPTICAL ARRANGEMENT, OPTICAL GRATING AND METHOD FOR THE MANUFACTURE OF SUCH AN OPTICAL GRATING

CROSS-REFERENCE TO RELATED APPLICATIONS

This application is a continuation of International Application PCT/EP03/00018, with an international filing date of Jan. 3, 2003, which was published under PCT Article 21(2) in German. The full disclosure of this International Application is incorporated herein by reference.

BACKGROUND OF THE INVENTION

1. Field of the Invention

The present invention relates to optical gratings and to optical arrangements comprising such gratings. The invention furthermore relates to a method for manufacturing such optical gratings.

2. Description of Related Art

Optical gratings are required to have an optimized performance for many optical applications. To date, optimal performance was synonymous with maximization of the reflection efficiency since, according to the classical approach, this also entails minimization of the absorption losses of the incident light in the grating. An optimized reflection efficiency makes it possible to achieve an intended output light power with a low input light power, which reduces the demands on the light source. Minimizing the absorption in the optical grating leads to an improvement in the long-term stability of the optical grating, since the thermal load on it due to the incident light power is reduced.

SUMMARY OF THE INVENTION

It is a first object of the invention to increase the performance of optical gratings and optical arrangements containing such gratings.

An optical grating according to the invention has a multiplicity of parallel diffraction structures, which are arranged on a support defining a base face. Each structure has a blaze flank that is inclined substantially at the Littrow angle with respect to the base face, and a back flank. Both flanks together form a reflection layer which comprises a reflective base layer and a transparent protective layer that is connected to the base layer and covers it. The protective layer on the blaze flank and the protective layer on the back flank are made of the same material. The thicknesses of the protective layers on the blaze flank and on the back flank, however, are different.

The new grating of the optical arrangement has protective layers with an average layer thickness which, even though layer thicknesses will often be referred to below without being more specific, do not always need to be the same as the local layer thickness. In the case of gratings with a small reflective area, the layer thickness of the protective layers is virtually constant everywhere on this area, so that the average layer thickness is equal to the local layer thickness. In the case of gratings with a larger reflective area, there may be a variation in the layer thickness so that the average layer thickness differs from the local layer thickness. Nevertheless, since the optical effects of layer thickness variations are generally averaged out when the area of the grating is considered as a whole, the definition of an average layer thickness will generally provide optimized performance of the grating overall.

The invention is associated with two surprising discoveries, which were obtained by optical calculations using electromagnetic diffraction theory:

On the one hand, the performance of an optical grating depends on the layer thickness of the protective layer on the back flank. Since the back flank is not generally exposed to the light from the light source when the optical arrangement is being used in Littrow operation, such a finding does not agree with classical geometrical optics. As has been discovered with the aid of electromagnetic diffraction theory, it is necessary to take into account an additional interaction which is due to the fact that some of the incident light propagates very close to at least one section of the back flank. This interaction can be compensated for by suitably dimensioning the layer thickness of the back flank so as to minimize the absorption of the incident light. Owing to a higher breakdown threshold, minimizing the absorption leads to greater durability and a very stable optical grating, in particular one without thermal drift effects.

The second surprising discovery which is provided by the optical calculations is that the layer thicknesses of the protective layer, for which the absorption is minimized, differ from those that maximize the reflection efficiency, which is a second quantity affecting the performance of the grating. Therefore it is not possible to employ reflection measurements when optimizing the layer thickness of the protective layer on the back flank in relation to absorption. Rather, the absorption optimization must be carried out independently of the reflection optimization. As has been discovered, optimum, i.e. minimized, absorption does not therefore automatically imply optimum, i.e. maximized, reflection efficiency, because even if the absorption is minimal, reflected components of the incident radiation may also be found in diffraction orders other than the useful one, which do not contribute to the reflection efficiency.

Commercial design programs for the layer optimization of thin-film systems are available for calculating the layer thicknesses. An optimized grating can thus be modelled with relatively little expense. However, it is also possible to calculate a layer thickness of the back flank as an empirical approximation even without using electromagnetic diffraction theory.

In many cases, a multilayer system as protective layer on the blaze flank leads to a further improved reflection efficiency, as is known for the coating of flat substrates.

With light having a TM polarization when it impinges on the grating, a particularly advantageous effect on the grating performance is obtained.

In the ideal case, the phase-dependent optical performance of a transparent optical layer operated in double transmission is repeated when its optical thickness is increased by an integer multiple of half the wavelength. An optical grating, in which the protective layer on the back flank has an average layer thickness which is larger than the average layer thickness of the protective layer on the blaze flank, is generally obtained when the associated minimum layer thicknesses needed in order to achieve optimized performance are defined for the layer thicknesses on the blaze flank and on the back flank. This relation therefore represents a first approximation for the production of an optical grating with increased performance.

The smaller the absolute layer thickness is, in general, the more accurately these layer thicknesses can be produced with known coating methods. An optical grating with layer thicknesses less than 100 nm therefore leads to a grating with increased performance, which is relatively simply to produce in a reproducible way.

An optical grating in which the base layer has a metal surface can be produced such that it has a relatively good performance even without any applied protective layer, and it therefore has good prerequisites for optimization by applications of the protective layer.

In the case of an optical grating in which the metal surface is formed by a metal layer applied to the support, the support material may be selected irrespective of its reflection properties so that, for example, the mechanical or thermal properties of the grating can be improved by the support material. An aluminum surface has a high reflectivity.

A dielectric layer is particularly suitable for the production of a protective layer for a grating optimized with respect to its performance.

It is also an object of the present invention to provide a method for the manufacture of an optical grating in which a predetermined layer-thickness relation between the layer thicknesses on the blaze flank and on the back flank can be achieved with the greatest possible precision.

According to the new method, the blaze flank and the back flank are coated simultaneously. This shortens the production compared with a method in which the blaze flank and the back flank are coated separately of each other. Furthermore this eliminates sources of error which could lead to a deviation from the predetermined layer thickness ratio, owing to differences between sequentially performed coating steps.

BRIEF DESCRIPTION OF THE DRAWINGS

Various features and advantages of the present invention will be more readily understood with reference to the following detailed description taken in conjunction with the accompanying drawing in which.

DESCRIPTION OF PREFERRED EMBODIMENTS

Figure 1:
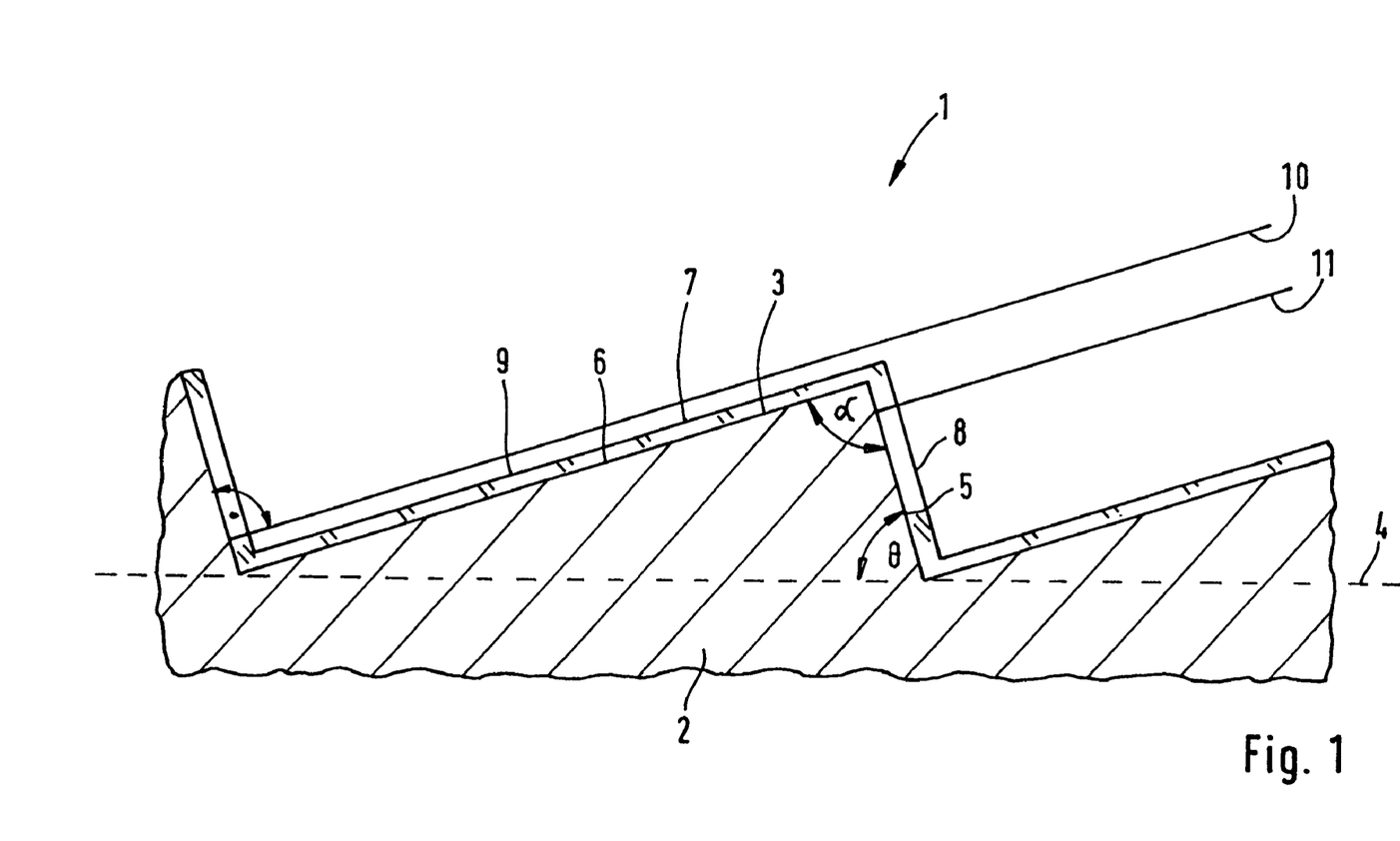
FIG. 1 shows a section through a detail of a Littrow grating, the section plane being perpendicular to the direction in which the diffraction structures of the Littrow grating extend.

FIG. 1 shows a detail of a Littrow grating denoted in its entirety by 1, comprising a support 2 on which a multiplicity of parallel, periodically arranged diffraction structures 3 are formed. The detail in FIG. 1 shows approximately two grating periods. The support 2 may be embodied as a metal support body, or made of quartz glass or another non-metallic material with a metal coating. A metal support 2 made of aluminum is used in the exemplary embodiments described below.

The surface of each diffraction structure 3 consists of two surface sections, each of which being inclined differently with respect to a base face 4 which is defined by the support 2.

The surface section inclined more steeply with respect to the base face 4 is formed by a blaze flank 5, which interacts with incident light rays in a way which will be further described below. The blaze flank 5 is inclined with respect to the base face 4 by an angle $\theta$ of 78.7°, which is a Littrow angle for incident light rays having a wavelength of 193.35 nm.

The other surface section of the diffraction structure 3 does not directly receive light rays when the Littrow grating 1 is being used. This other surface section is formed by a back flank 6 extending between the blaze flanks 5 of two adjacent diffraction structures 3. The blaze flank 5 and the back flank 6 of a diffraction structure 3 make an apex angle $\alpha$ of 90° between them. A smaller or larger apex angle may also be provided as an alternative.

The diffraction structures 3 are provided with a transparent protective layer 7, which is composed of a blaze flank protective layer 8 for the blaze flank 5 and a back flank protective layer 9 for the back flank 6.

The protective layer 7 consists of $MgF_2$ in the embodiment shown in FIG. 1. The layer thickness $C_b$ of the blaze flank protective layer 8 is greater than that $C_l$ of the back flank protective layer 9. The choice of the layer thicknesses $C_b$, $C_l$ has an effect on the reflection efficiency and the absorption of the Littrow grating with respect to the incident light rays, as will be explained below.

In the following the function of the Littrow grating shown in FIG. 1 will be explained.

In relation to coherent light rays with parallel incidence, which are emitted by a light source (not shown) and among which the light rays 10, 11 are represented in FIG. 1 by way of example, the Littrow grating 1 is arranged so that the blaze flanks 5 are perpendicular to the incident light rays 10, 11. When they are reflected by the blaze flanks 5, the light rays 10, 11 pass through the blaze flank protective layer 8.

As can be found from theoretical considerations based on electromagnetic diffraction theory, light rays which strike the Littrow grating 1 in close proximity to a back flank 6, for example the light ray 10, interact with the back flank 6 or the back flank protective layer 9 even though no such interaction is found from classical geometrical optics. This interaction leads to a dependency of the absorption and the reflection efficiency of the Littrow grating not only on the layer thickness of the blaze flank protective layer 8, but also on the layer thickness of the back flank protective layer 9. This will be explained in more detail below.

The grating period D of the Littrow grating 1 is dimensioned, with 83.136 grating periods per millimeter, so that constructive interference is obtained in a high diffraction order for the light rays 10, 11 with the light wavelength of 193.35 nm. The Littrow grating 1 is thus operated as an echelle grating. Typically used diffraction orders are in the range of the $10^{th}$ to $150^{th}$ diffraction order.

The protective layer 7 is produced using a physical vapour deposition (PVD) method, which will be briefly explained below with reference to FIG. 2.

Figure 2:
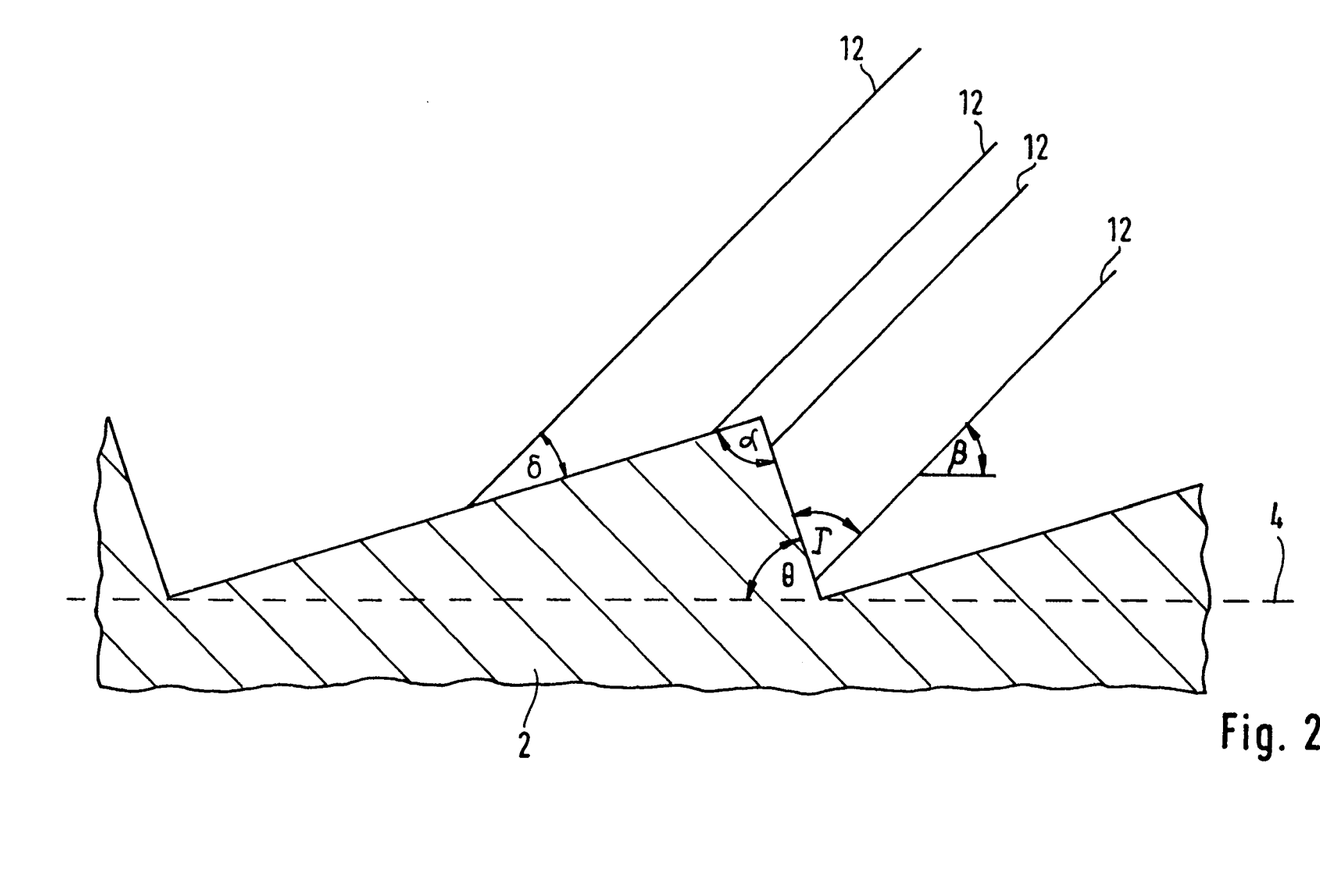
FIG. 2 shows a similar section to FIG. 1 through a support for a Littrow grating according to FIG. 1.

The support 2 is held in an adjustable mount (not shown) and is exposed to approximately parallel coating beams 12, which are produced by a heatable vapour source not represented in FIG. 2. The coating beams 12 make a coating angle β with the base face 4 of the support 2. At this coating angle β, the coating beams 12 make a blaze flank coating angle Γ with the blaze flank 5 and a back flank coating angle δ with the back flank 6. The angles Γ and δ are determined by the Littrow angle θ, the coating angle β and the apex angle α.

In order to obtain a predetermined layer-thickness ratio $C_b/C_l$, the adjustable mount is used to orient the support 2 with respect to the coating beams 12 so that the blaze flank coating angle Γ and the back flank coating angle δ satisfy the following relation:

$$\sin \Gamma / \sin \delta = C_b C_l \quad (1)$$

The support 2 is exposed until the predetermined layer thicknesses $C_b$, $C_l$ have been reached. As is known to the person skilled in the art, this may for example be done using comparative measurements of the layer thicknesses of reference supports exposed at the same time, which in the ideal case have the same alignment as the two grating flanks.

The results of calculations based on electromagnetic diffraction theory will be explained below. They show the dependency of the reflection efficiency and the absorption of the Littrow grating 1 on the layer thicknesses $C_b$ of the blaze flank protective layer 8 and $C_l$ of the back flank protective layer 9. The layer thicknesses $C_b$, $C_l$ are indicated as measured perpendicularly to the blaze and back flanks, respectively. The results of the calculations are represented as three-dimensional mesh lines in FIGS. 3 to 8, in which equal reflection coefficients and absorptions are respectively plotted as contour lines for clarity. The reflection and absorption values are calculated for incident light rays 10, 11 with a TM polarization, i.e. polarized perpendicularly to the direction in which the diffraction structures 3 extend.

Figure 3:
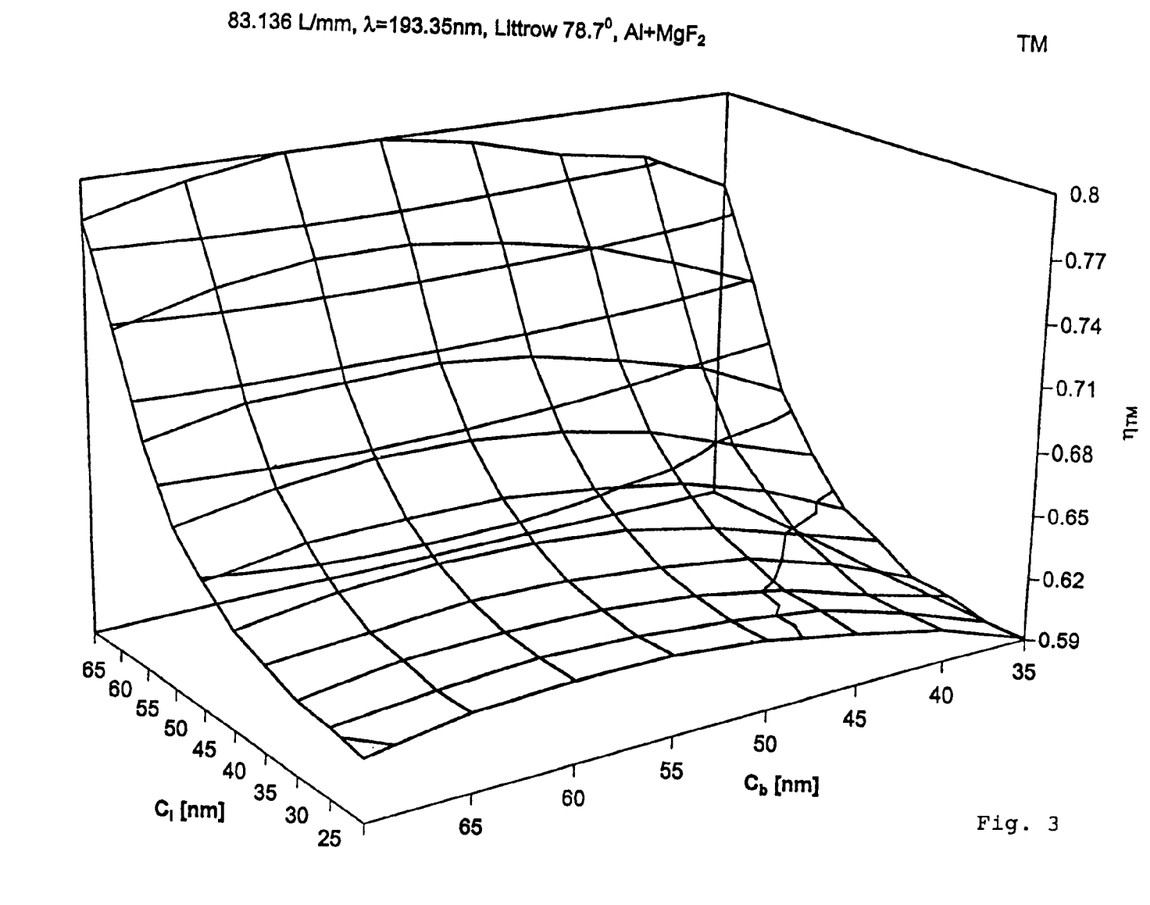
FIG. 3 shows the dependency of the reflection efficiency of a Littrow grating according to FIG. 1 on the layer thicknesses $C_b$, $C_l$ on the blaze flank and on the back flank of the Littrow grating, in a three-dimensional representation.

FIG. 3 shows the reflection efficiency as a function of the layer thicknesses $C_b$, $C_l$ for a grating according to FIG. 1, with a support 2 made of aluminum and a protective layer 7 made of $MgF_2$.

Essentially irrespective of $C_l$, the Littrow grating 1 has a maximum reflection efficiency with $C_b$ in the range of from 55 to 60 nm. It is only the position of the reflection maximum, however, and not the absolute value which is independent of $C_l$ in this case. For the aforementioned range of $C_b$ between 55 and 60 nm, this occurs at $C_l$=65 nm and amounts to 80%. At lower $C_l$ values, the reflection efficiency falls off rapidly for all $C_b$ values. With a $C_l$ value of 20 nm, only a value of about 64% can be achieved as a maximum value for the reflection efficiency. For $C_l$ values greater than $C_l$=65 nm, which are not represented in FIG. 3, the reflection efficiency falls off even faster.

Figure 4:
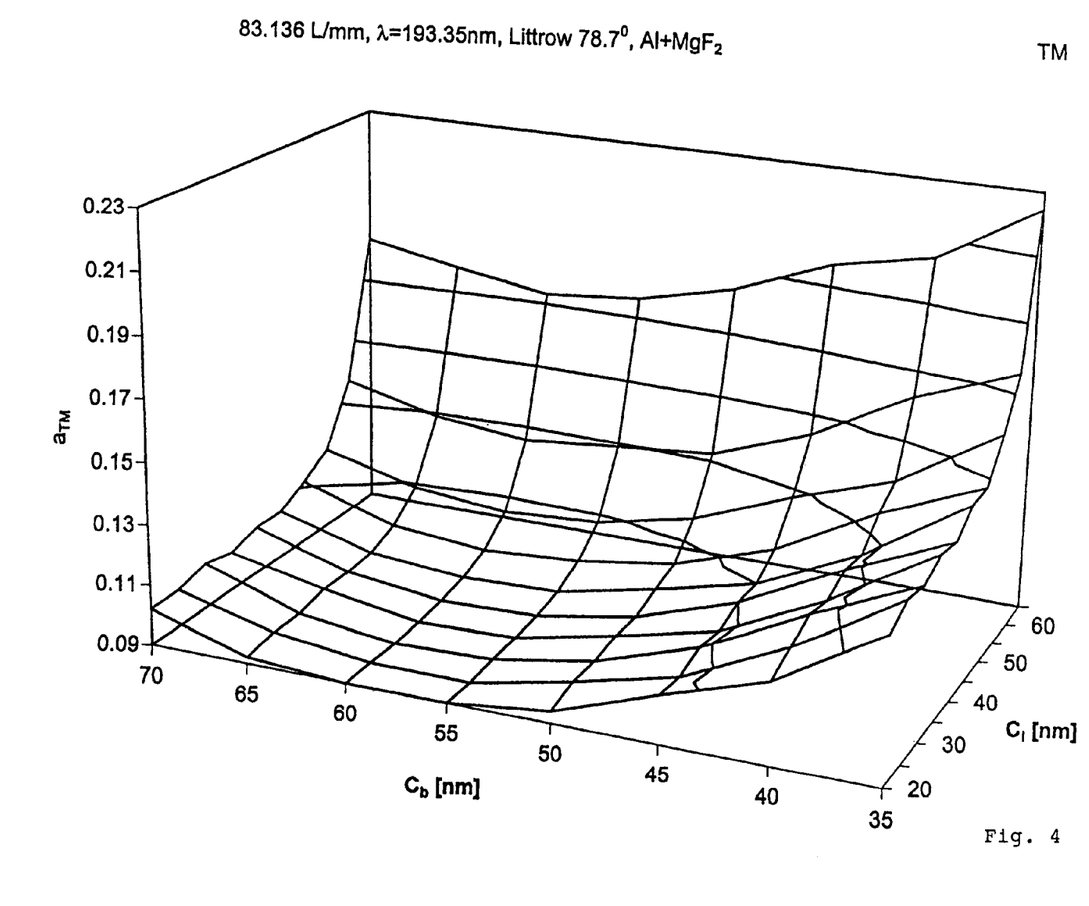
FIG. 4 shows the dependency of the absorption by a Littrow grating according to FIG. 3 on the layer thicknesses $C_b$, $C_l$ on the blaze flank and on the back flank of the Littrow grating, in a three-dimensional representation.

FIG. 4 shows the absorption by the Littrow grating 1 for the same $C_b$, $C_l$ ranges as in FIG. 3.

In the figures representing the absorption, the numerical values of the absorption stand for the fraction of light energy absorbed. For example, an absorption value of 0.09 indicates that 9% of the light energy incident on the Littrow grating 1 will be absorbed.

The absorption minimum at a value of 0.09 is obtained for a thickness range of $C_b$ between 55 and 60 nm and for a layer thickness $C_l$ of 20 nm. This absorption minimum does not correspond to the reflection-efficiency maximum (cf. FIG. 3), which is achieved at a different $C_l$ value, namely 65 nm. The absorption is in turn not minimal at the reflection-efficiency maximum, but rather has a value of close to 0.18.

Figure 5:
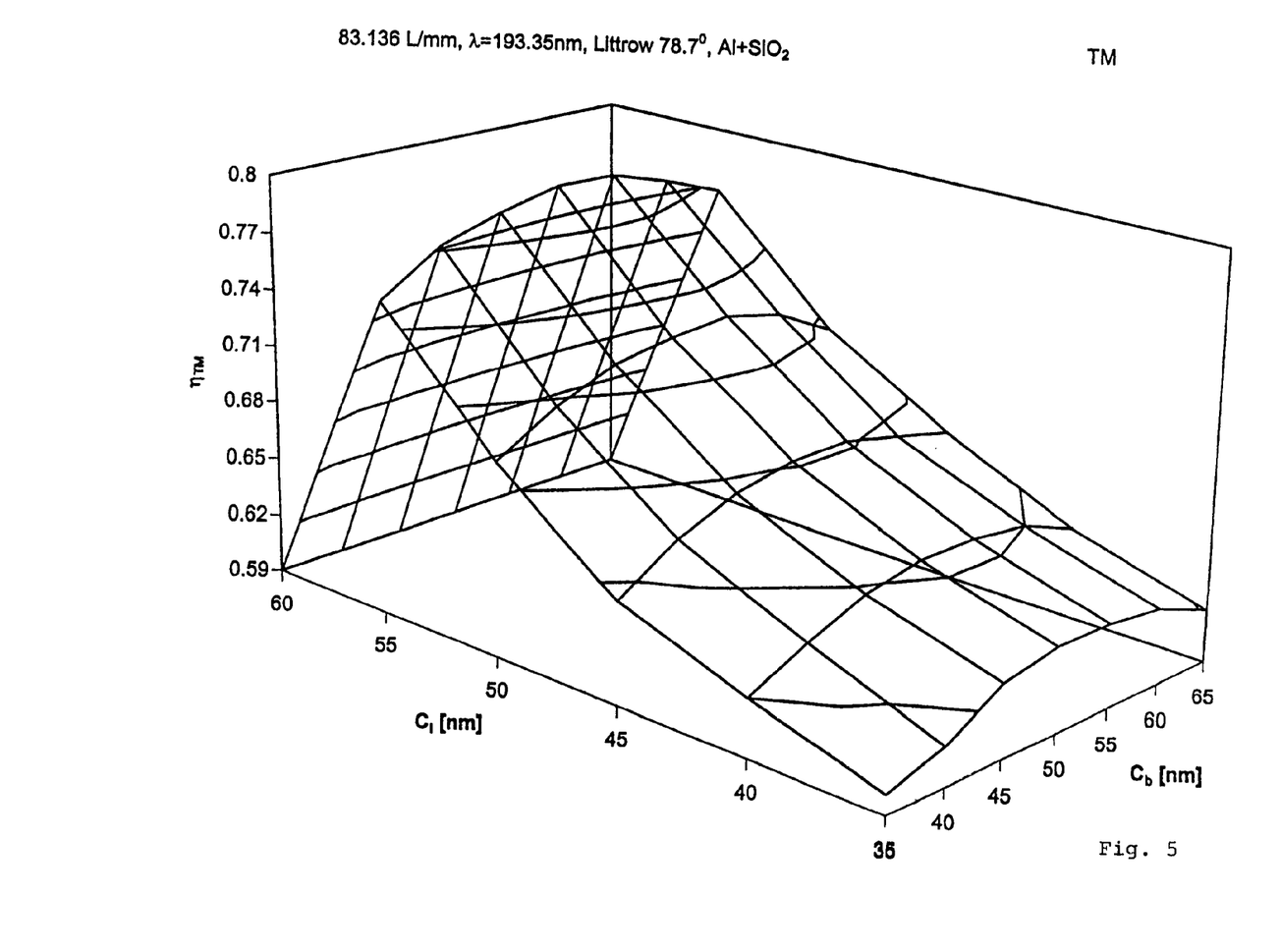
FIG. 5 shows the dependency of the reflection efficiency of an alternatively coated Littrow grating according to FIG. 1 on the layer thicknesses $C_b$, $C_l$ on the blaze flank and on the back flank of the Littrow grating, in a three-dimensional representation.
Figure 6:
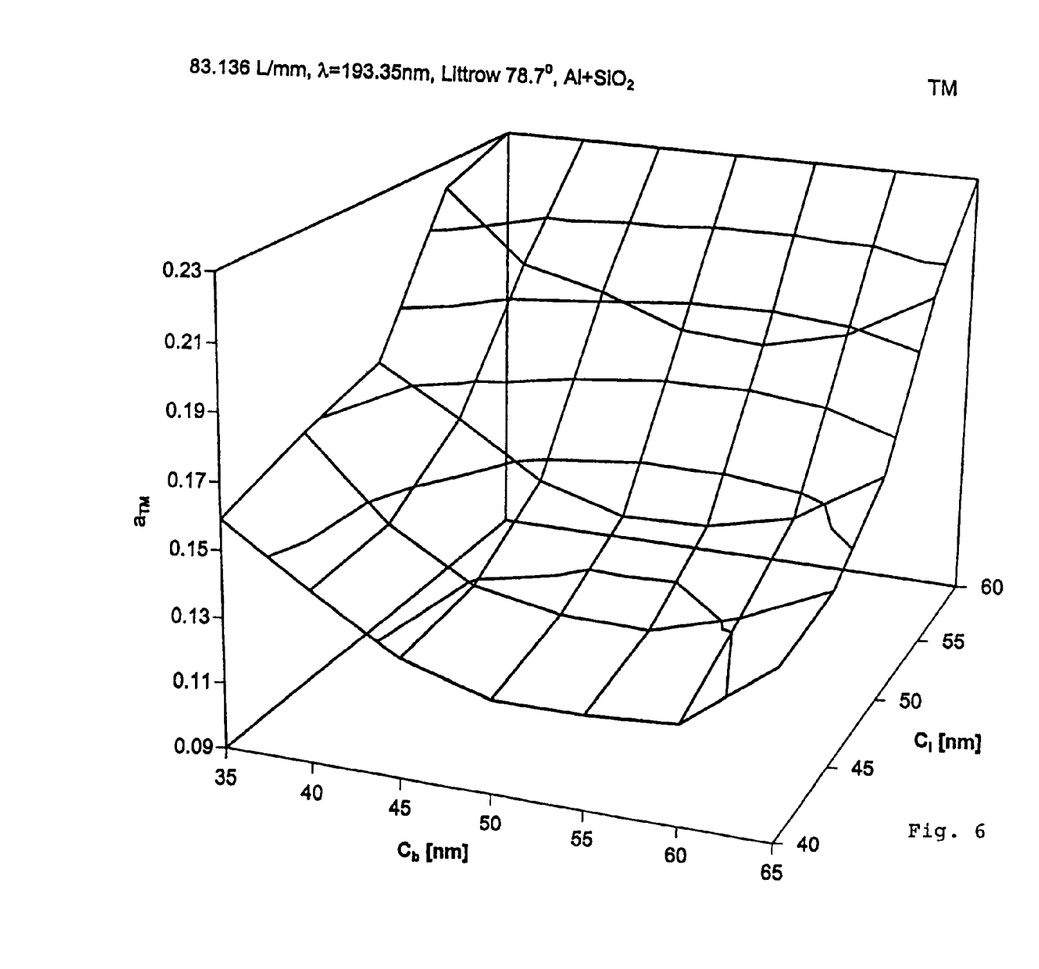
FIG. 6 shows the dependency of the absorption by a Littrow grating coated according to FIG. 5 on the layer thicknesses $C_b$, $C_l$ on the blaze flank and on the back flank of the Littrow grating, in a three-dimensional representation.

FIGS. 5 and 6, and respectively 7 and 8, show results calculated in the same way as FIGS. 3 and 4 for the reflection efficiency and the absorption of two other embodiments of a Littrow grating, which differ from the one represented in FIG. 1 by the material of the protective layer 7. This material is $SiO_2$ in the case of the Littrow grating of FIGS. 5 and 6, and $Al_2O_3$ in the case of the Littrow grating of FIGS. 7 and 8.

As FIG. 5 shows, in the case of the Littrow grating with a $SiO_2$ coating, the reflection maximum is achieved with $C_b$ in the range of between 50 and 55 nm and with $C_l$ close to 55 nm. Here again, the reflection efficiency has a maximum value of about 80%. Around this reflection maximum, similarly as in the embodiment according to FIGS. 3 and 4, the reflection efficiency has a relatively strong dependency on $C_l$ and, compared with this, a weaker dependency on $C_b$. The reflection efficiency falls off quite steeply at $C_l$ values larger than 55 nm and, for example, amounts to only 40% at $C_l$=60 nm almost independently of the values represented for $C_b$, whereas it falls off less strongly for $C_l$ values of less than 55 nm.

FIG. 6 shows the absorption ratios for the grating with an $SiO_2$ coating. A minimum absorption of about 0.11 is reached with $C_b$ in the range of between 50 and 55 nm and with $C_l$ close to 40 nm. The absorption rises for other $C_b$ values and for higher $C_l$ values. Here again, as was previously the case in the first exemplary embodiment, the absorption minimum is obtained at other $C_b$, $C_l$ values than the reflection maximum.

The third exemplary embodiment, which will be described below, also shows similar main dependencies of the reflection efficiency and the absorption on the layer thicknesses.

Figure 7:
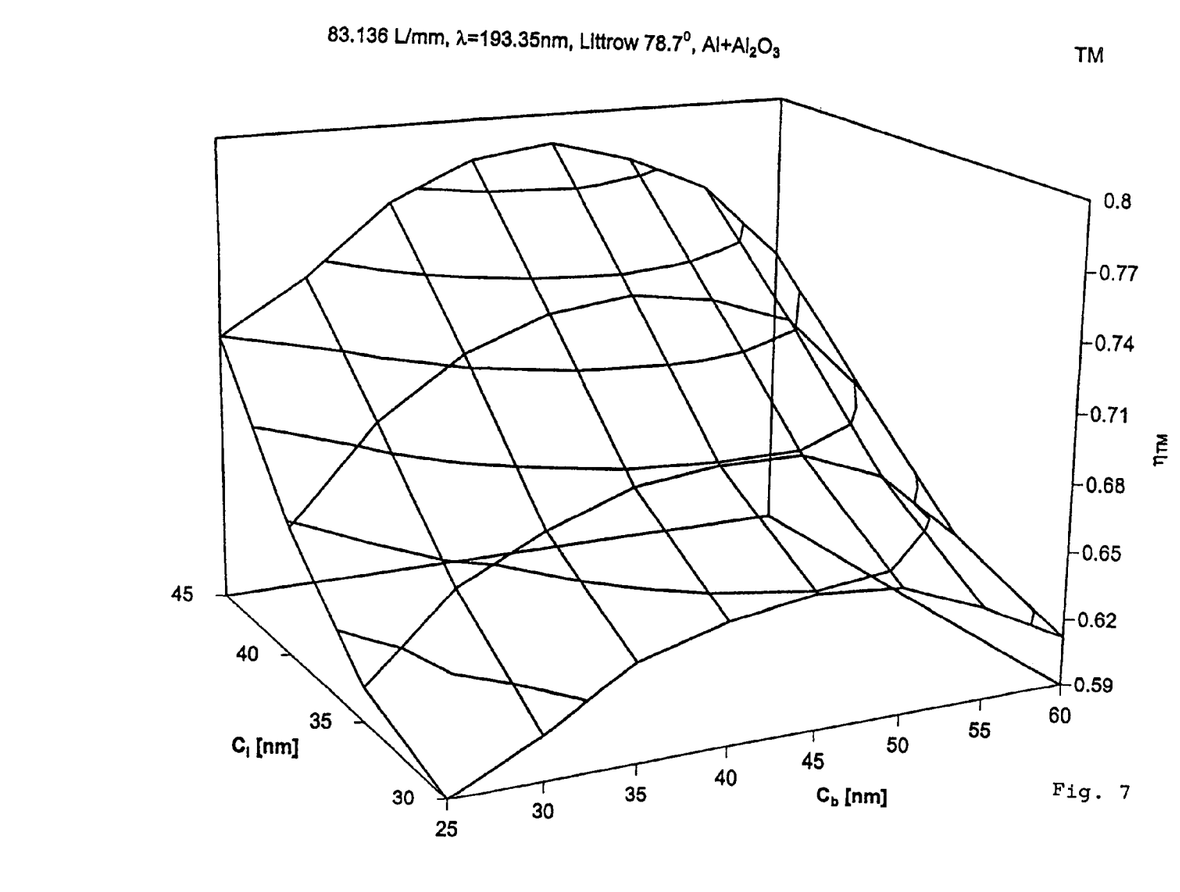
FIG. 7 shows the dependency of the reflection efficiency of another alternatively coated Littrow grating according to FIG. 1 on the layer thicknesses $C_b$, $C_l$ on the blaze flank and on the back flank of the Littrow grating, in a three-dimensional representation.

FIG. 7 shows the reflection efficiencies for the third exemplary embodiment with an $Al_2O_3$ protective layer. Here, the reflection maximum is obtained at $C_b$=$C_l$ close to 45 nm. The reflection efficiency likewise amounts to about 80% in this case.

Figure 8:
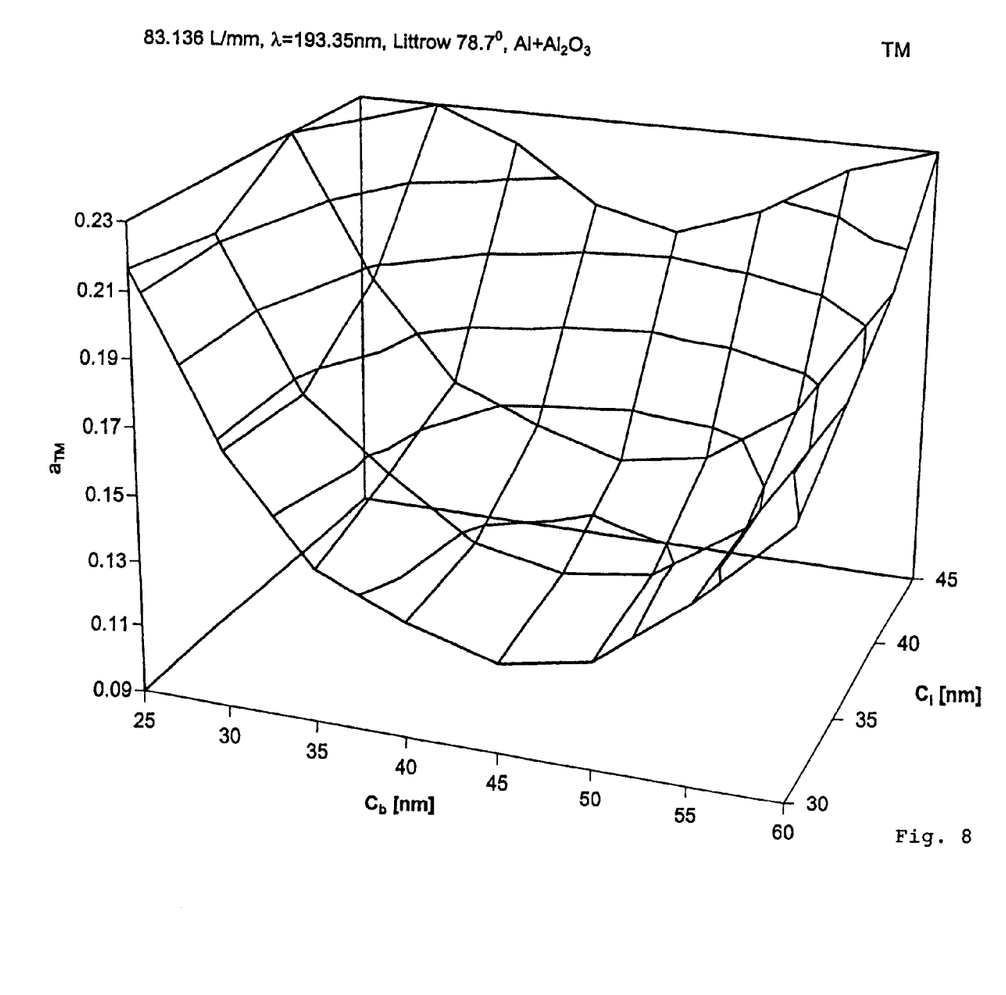
FIG. 8 shows the dependency of the absorption by a Littrow grating coated according to FIG. 7 on the layer thicknesses $C_b$, $C_l$ on the blaze flank and on the back flank of the Littrow grating, in a three-dimensional representation.

FIG. 8 shows the absorption ratios in the case of the Littrow grating with an $Al_2O_3$ coating. The absorption minimum with a value of about 0.11 is obtained with $C_b$ close to 45 nm and $C_l$ close to 30 nm.

The profiles calculated for the reflection efficiency and the absorption have a common feature that the optima for the reflection efficiency and the absorption are respectively achieved at the same values of the layer thickness $C_b$ of the blaze flank protective layer 8. These values depend on the refractive index of the material of the protective layer, as demonstrated by the following table which reports the optimum layer thicknesses $C_b$ for the various protective-layer materials:

| Material | N = n + ik (193 nm) | Optimum layer thicknesses $C_b$ (nm) |
| --- | --- | --- |
| $MgF_2$ | 1.44 | 57 |
| $SiO_2$ | 1.56 | 52 |
| $Al_2O_3$ | 1.78 + i · 0.001 | 45 |

The refractive indices N at 193 nm are also indicated here for the materials. Since $Al_2O_3$ has a non-negligible absorption at 193 nm, a complex refractive index is indicated in this case.

As comparative calculations have shown, these values for the optimum layer thickness $C_b$ on the blaze flank correspond approximately to the results of a conventional layer-thickness calculation, as is known for highly reflective coatings on flat supports. Besides the refractive index of the protective-layer material, the complex refractive index of the support material is also included in this calculation.

From the results of electromagnetic diffraction theory (cf. FIGS. 3 to 8) or the results of the conventional layer-thickness calculation for $C_b$, it is straightforward to provide a layer thickness $C_b$ which is very close to the optimum layer thickness, for a different protective-layer material. This quasi-optimum layer thickness $C_b''$ for a new protective-layer material is found from the empirical relation $$C_b'' = C_b n/n'' \quad (2)$$

where n denotes the refractive index of the protective-layer material for which the optimum layer thickness $C_b$ is known, and $n''$ denotes the refractive index of the new material.

Instead of a single protective layer 7 on the blaze flank 5, as was the case in the exemplary embodiments discussed above, a multilayer system may also be applied to the blaze flank in another variant of the Littrow grating. To that end, a second material with a higher refractive index $n_H$ is used in addition to a first material for the protective layer with a refractive index n.

Figure 9:
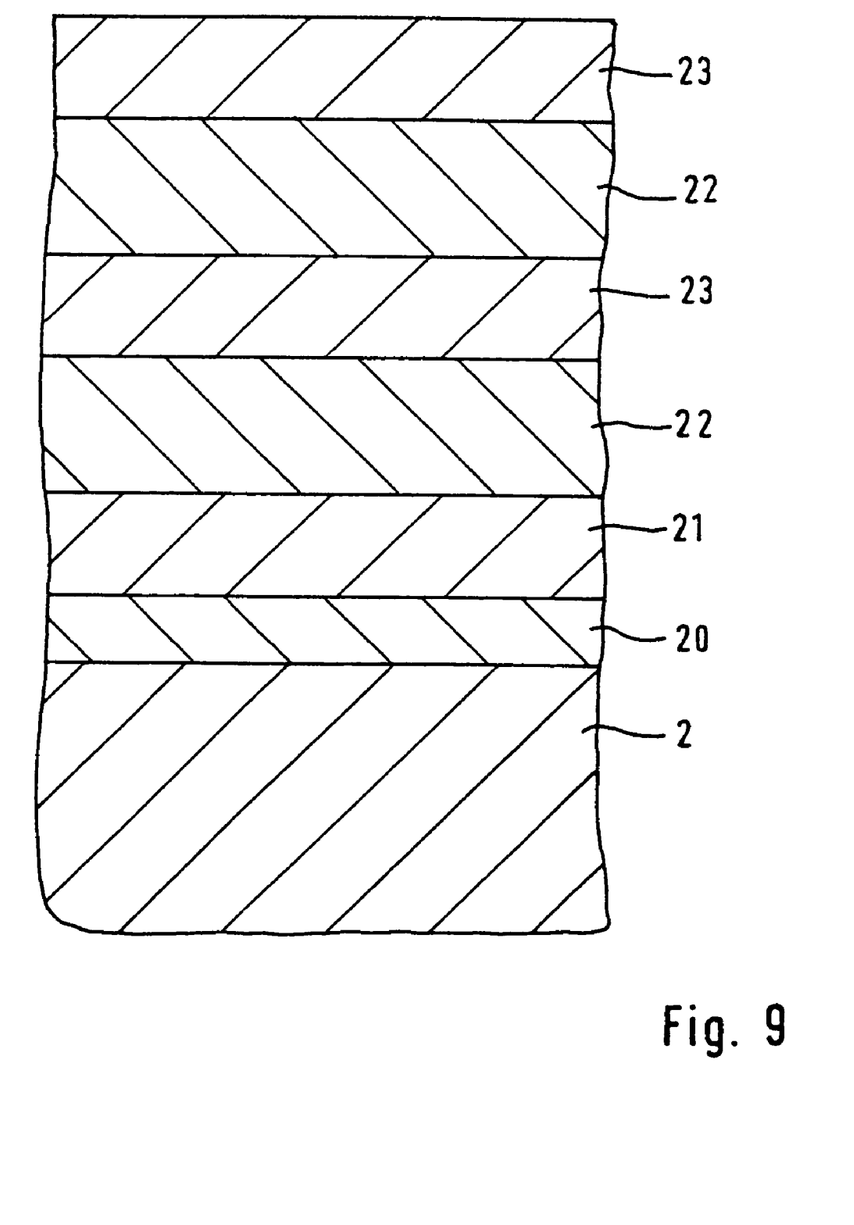
FIG. 9 shows a section through a detail of a Littrow grating which is coated with a multilayer coating system.

FIG. 9 shows an example of such a multilayer system. As is known for highly reflective dielectric multilayer systems on flat substrates, starting from the metal layer of the support 2, the following layer sequence is selected:

support 2
layer 20 with refractive index n
layer 21 with refractive index $n_H$

Depending on the desired number of layers in the multilayer system, this may be supplemented with further layer pairs 22, 23 (by two of them in the example of FIG. 9) with the sequence:

layer 22 with refractive index n
layer 23 with refractive index $n_H$, each with an optical thickness of $\lambda/4$.

In the example of FIG. 9, for a laser wavelength of 193 nm, the values of the refractive indices and the layer thicknesses of the layers 20 to 23 may be as follows:

layer 20 with a refractive index of 1.44 and a layer thickness of 21 nm
layer 21 with a refractive index of 1.78 and a layer thickness of 27 nm
layers 22 with a refractive index of 1.44 and a layer thickness of 34 nm
layers 23 with a refractive index of 1.78 and a layer thickness of 27 nm.

The thickness of the first layer 20 applied to the support 2 will in this case be selected according to the result of a ray-optical layer-thickness calculation for thin-film systems to minimize reflection for a dielectric coating on a flat reflective base layer, namely the support 2, while taking the complex refractive index of this base layer into account. All other layers 21 to 23 of the multilayer system have the optical thickness $\lambda/4$.

If the blaze flank is to be coated with such a multilayer system, then the blaze flank and the back flank will not be coated together as represented in FIG. 2, but instead independently of each other. In a first method step, the multilayer system is in this case applied to the blaze flank, the Littrow grating being arranged so that the back flank lies in the coating shadow of the coating beams. When the back flank is being coated, account is optionally be taken of the fact that a small proportion of the coating material may already have been deposited on it while the blaze flank was being coated. It is also possible to apply the first layer of the multilayer system together with the layer on the back flank, as was described above in connection with the single protective layers.

In order to be able to provide a layer thickness $C_l$ to minimize the absorption for the back flank even for other material combinations (comprising support material and protective-layer material) than those which were described above, without resorting to electromagnetic diffraction theory, an approximation formula for calculating $C_l$ is given below. To minimize the absorption by the Littrow grating, the layer thickness $C_l$ should essentially satisfy the following relation:

$$C_l = \lambda/(4n) \quad (3)$$

Here, $\lambda$ denotes the wavelength of the light rays interacting with the grating and n denotes the refractive index of the protective-layer material for the back flank. The layer thickness $C_l$ should not differ from this value by more than $\lambda/(8n)$.

A corresponding approximation formula can also be given for the layer thickness $C_l$ to achieve maximum efficiency. In order to maximize the reflection efficiency of the Littrow grating, the layer thickness $C_l$ should essentially satisfy the following relation:

$$\lambda/(4n) \leq C_l < \lambda/(2n) \quad (4)$$

In the event that this interval for $C_l$ is too broad, the range for $C_l$ may be restricted to from 0.7 to 0.9 times the upper limit of the above formula (4).

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

The invention claimed is:

1. An optical arrangement comprising:
   a light source which emits coherent light,
   an optical grating that has a multiplicity of parallel diffraction structures, which
      are arranged on a support defining a base face,
      each comprise a blaze flank, inclined substantially at the Littrow angle with respect to the base face, and a back flank, and
      together form a reflection layer which comprises a reflective base layer and a transparent protective layer connected to the base layer and covering the base layer, wherein the protective layer on the blaze flank has an average layer thickness $C_b$ and the protective layer on the back flank has an average layer thickness $C_l$, the values of the average layer thicknesses $C_b$ and $C_l$ being selected independently of each other in such a way that the absorption of the coherent light by the optical grating is minimized.

2. The optical arrangement of claim 1, wherein the optical thickness of the protective layer on the back flank is approximately one quarter of the light wavelength of the coherent light emitted by the light source.

3. The optical arrangement of claim 1, wherein that the average layer thickness $C_b$ of the protective layer on the blaze flank is selected according to the result of a ray-optical layer thickness calculation for thin-film systems, said calculation being adapted to maximize the reflection for a dielectric coating on a flat reflective base layer and taking into account the complex refractive index of the flat reflective base layer.

4. The optical arrangement of claim 3, wherein the protective layer on the blaze flank is designed as a multilayer system comprising successive layers of two dielectrics having different refractive indices.

5. The optical arrangement of claim 1, wherein the coherent light emitted by the light source has a TM polarization when the coherent light impinges on the grating.

6. The optical grating of claim 1, wherein the
protective layer on the back flank has an average layer thickness $C_l$ which is smaller than the average layer thickness $C_b$ of the protective layer on the blaze flank.

7. The optical grating of claim 1, wherein the average layer thickness $C_b$ of the protective layer on the blaze flank and the average layer thickness $C_l$ of the protective layer on the back flank are less than 100 nm.

8. The optical grating of claim 1, wherein the base layer has a metal surface.

9. The optical grating of claim 8, wherein the metal surface is formed by a metal layer applied to the support.

10. The optical grating of claim 8, wherein the metal is aluminum.

11. The optical grating of claim 1, wherein the protective layer comprises a dielectric layer.

12. The optical grating of claim 11, wherein the protective layer is made of $MgF_2$.

13. The optical grating of claim 11, wherein the protective layer is made of $SiO_2$.

14. The optical grating of claim 11, wherein the protective layer is made of $Al_2O_3$.

15. An optical arrangement comprising:
a light source which emits coherent light,
an optical grating that has a multiplicity of parallel diffraction structures, which
are arranged on a support defining a base face,
each comprise a blaze flank, inclined substantially at the Littrow angle with respect to the base face, and a back flank, and
together form a reflection layer which comprises a reflective base layer and a transparent protective layer connected to the base layer and covering the base layer, wherein the protective layer on the blaze flank has an average layer thickness $C_b$ and the protective layer on the back flank has an average layer thickness $C_l$, the values of the average layer thicknesses $C_b$ and $C_l$ being selected independently of each other in such a way that the diffraction efficiency for the coherent light is maximized.

16. The optical arrangement of claim 15, wherein the layer thickness $C_l$ of the protective layer on the back flank satisfies the following relation:

$$\lambda/(4n) \leq C_l < \lambda/(2n),$$

where $\lambda$ denotes the wavelength of the coherent light emitted by the light source, and n denotes the refractive index of a material from which the protective layer is made.

17. The optical arrangement of claim 15, wherein that the average layer thickness $C_b$ of the protective layer on the blaze flank is selected according to the result of a ray-optical layer thickness calculation for thin-film systems, said calculation being adapted to maximize the reflection for a dielectric coating on a flat reflective base layer and taking into account the complex refractive index of the flat reflective base layer.

18. The optical arrangement of claim 17, wherein the protective layer on the blaze flank is designed as a multilayer system comprising successive layers of two dielectrics having different refractive indices, 19. The optical arrangement of claim 14, wherein the coherent light emitted by the light source has a TM polarization when the coherent light impinges on the grating.

* * * * *